No. 623,792. Patented Apr. 25, 1899.
A. C. LANS.
TOOL.
(Application filed Nov. 18, 1898.)
(No Model.)
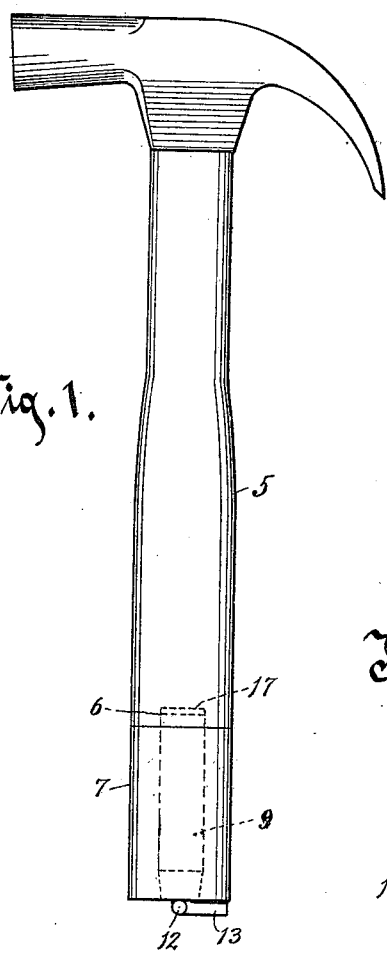
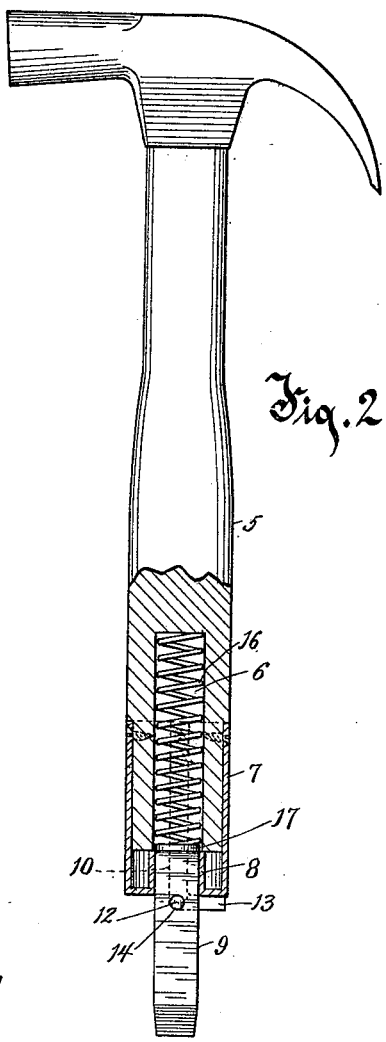
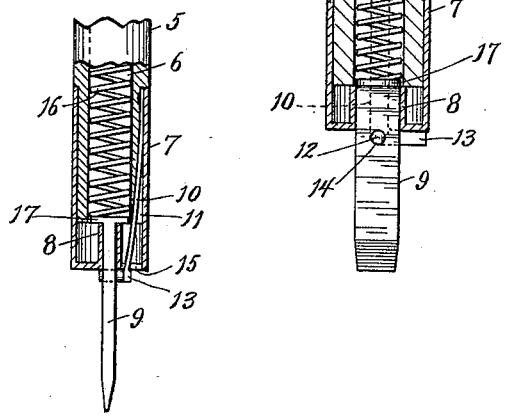
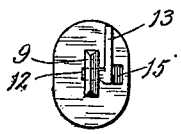
Witnesses.
Inventor.
Andrew C. Lans.
By Benedict and Morsell
Attorneys.

UNITED STATES PATENT OFFICE.

ANDREW C. LANS, OF RIB LAKE, WISCONSIN.

TOOL.

SPECIFICATION forming part of Letters Patent No. 623,792, dated April 25, 1899.

Application filed November 18, 1898. Serial No. 696,774. (No model.)

*To all whom it may concern:*

Be it known that I, ANDREW C. LANS, of Rib Lake, in the county of Taylor and State of Wisconsin, have invented a new and useful Improvement in Tools, of which the following is a description, reference being had to the accompanying drawings, which are a part of this specification.

My invention has relation to an improved tool, more especially intended, although not necessarily, as a screw-driver to be applied to the end of the handle of a tool, preferably to the handle of a hammer.

The invention refers to that class of tools wherein the tool-blade is capable of being pushed or otherwise forced and held in a socket or recess in the end of the handle when said screw-driver is not being used, so that the blade will be entirely out of the way, and when it is desired to use the screw-driver to provide for readily allowing said blade to be forced or otherwise brought outwardly to working position and held in said working position.

The object of my invention is to provide an improved construction of tool of the above character, as will be hereinafter more fully described, the invention consisting of the devices and parts or their equivalents, as hereinafter more fully set forth.

In the accompanying drawings, in which similar numerals of reference refer to similar parts, I have shown the screw-driver as arranged in connection with the handle of an ordinary hammer.

In the drawings, Figure 1 is a side view of a hammer with my improvements applied thereto, showing the screw-driver as having been pushed or otherwise forced inwardly into the end of the hammer-handle. Fig. 2 is an elevation of a hammer with the screw-driver shown as thrust or otherwise forced outwardly to its working position, the end of the hammer-handle being broken away or sectioned to disclose the interior construction. Fig. 3 is a view at right angles to Fig. 2, but showing only a fragment of the end of the handle and also showing said end of the handle as broken away or sectioned; and Fig. 4 is an end view of the handle with the blade of the screw-driver out.

Referring to the drawings, the numeral 5 indicates a handle to which my improved screw-driver is applied. This handle may serve solely as a handle for the screw-driver, or the end opposite to the screw-driver end may have any other tool connected thereto—such, for instance, as a hammer, as shown in the accompanying drawings. The end of the handle is formed with a socket or recess 6, extending inwardly for a desired distance, said socket or recess being adapted to receive and accommodate the screw-driver blade. The end of the handle is also surrounded by a countersunk metallic sleeve or thimble 7, the end of said sleeve or thimble extending beyond the end of the handle proper and provided with an inwardly-extending casing 8, said casing having a shape in cross-section conforming to the cross-sectional shape of the screw-driver blade and forming a guide for said blade. This thimble or sleeve strengthens the end of the wooden handle, which would otherwise be weak by reason of the formation of the socket or recess therein, and the part 8 not only forms a guide for the blade, but, furthermore, prevents said blade from tilting in the socket 6, which would occur if the guide were not provided, inasmuch as said socket is made larger in cross-sectional area than the blade in order to accommodate the coiled spring hereinafter referred to.

The screw-driver blade hereinbefore referred to is indicated by the numeral 9, and this blade is adapted when not in use to be pushed or otherwise forced into the socket or recess in the end of the handle, as shown in Fig. 1, and when desired to be used to be pulled or otherwise forced outwardly to the position shown in Figs. 2, 3, and 4. When pushed inwardly, it is desirable that some means should be provided for releasably holding the blade to this position, and when pulled or otherwise forced outwardly it is absolutely essential that means should be provided for releasably, but firmly, holding said blade in this working position. For the purpose of holding the blade in its outer working position I employ the form of catch shown in the accompanying drawings, which consists of a spring-arm 10, which is secured at its inner end to the side wall of a recess 11 in the end of the handle, said recess extending outwardly through the outer end of the handle, so as to permit the spring-arm to extend out slightly beyond the end of the thimble. This outer extremity of the spring-arm is provided with a lug 12, extending therefrom at one angle, and a finger-piece 13 extending therefrom at another angle, said finger-piece working against the end of the thimble. The lug 12 may be made to engage the screw-driver blade in any desirable manner, so as to hold said blade firmly, but releasably, when the blade is adjusted outwardly. I prefer, however, to provide the blade with an opening 14, which the lug will automatically engage when the blade is adjusted outwardly and the finger-piece released. The end of the thimble should be provided with a lateral slot 15 of sufficient length to allow the spring-arm to be sprung outwardly laterally a sufficient distance to release the lug from the opening 14 of the blade or other engaged part of said blade. The lug 12 will also serve to hold the screw-driver blade in its socket or recess when said blade is thrust inwardly by merely removing finger-pressure from the finger-piece 13 and allowing the spring-arm to again force the lug inwardly to engage over the end of the blade, as clearly shown in Fig. 1.

If desired, the screw-driver blade may be made spring-actuated, so that when the blade is in its non-working position in its socket or recess and the lug is released from engagement with the blade the spring will automatically force the blade outwardly. For this purpose I prefer to arrange within the socket or recess 6 a coiled spring 16, the inner end of said spring bearing against the inner end wall of the socket or recess and the outer end of the spring bearing against the inner end of the blade. When, therefore, the blade is forced inwardly in its socket, the spring is compressed. The inner end of the blade is formed or provided with an enlargement or head 17, which enlargement or head is somewhat less in horizontal area than the space across the socket 6, so as not to interfere with the free movement of the blade inwardly and outwardly; but said head or enlargement, however, is somewhat greater in horizontal area than the outer open end of the socket 6. By this construction said enlargement or head not only provides an augmented bearing-surface for the spring against the inner end of the blade, but said enlargement or head forms a stop to prevent the entire withdrawal of the blade on the outward adjustment of said blade and adapts the spring-catch to engage the blade the moment said blade has been pulled outwardly to the limit permitted by the stop. Furthermore, by providing this stop in case the catch should for any reason fail to engage the blade said blade is absolutely prevented from being pulled entirely out of the socket 6. This form of blade with the inner enlarged end or head forming the stop 17 is not necessarily restricted to a tool in which the specific form of thimble herein shown and described is employed, inasmuch as the construction referred to would work equally well, even though the thimble were entirely omitted. With this arrangement of coiled spring within the socket when the blade is forced inwardly into the socket and it is desired to bring the blade outwardly to working position the catch is released and the recoil of the spring will automatically force said blade outwardly, and when the opening of the blade comes into register with the lug carried at the end of the spring-arm said lug will automatically pass into the opening of the blade, and thereby firmly, but releasably, hold said blade to adjusted position.

While I have herein shown and described the tool-blade as being a screw-driver blade, yet I do not wish to be understood as restricting myself to a blade of that particular character, inasmuch as any form of tool-blade may be employed—such, for instance, as a knife, file, &c.—without departing from the spirit and scope of my invention.

What I claim as my invention is—

1. In a tool, the combination, of a handle having a socket extending inwardly from the end thereof, a thimble or sleeve surrounding said end of the handle, and projecting a desired distance from said end of the handle so as to leave a space between the end of the thimble and the end of the handle, said end of the thimble having an opening therein, with a tubular guide extending from the opening inwardly toward the end of the handle, and in alinement with the socket of the handle, a tool-blade provided at its inner end with an enlargement or head fitting the socket, and said blade adapted to be adjusted inwardly into the socket, when the tool is not in use, and to be adjusted outwardly through the opening in the end of the thimble, when the tool is to be used, said blade fitting and conforming in cross-sectional shape to the cross-sectional shape of the guide, but being less in cross-sectional area than the cross-sectional area of the socket in the handle, a coiled spring located in said socket in the handle, and fitting against the enlargement or head of the blade, and means for releasably holding the blade in its outwardly-adjusted position.

2. In a tool, the combination, of a handle having a socket extending inwardly from the end thereof, a thimble or sleeve surrounding the said end of the handle, and projecting a desired distance beyond said end of the handle, so as to leave a space between the end of the thimble and the end of the handle, said end of the thimble having an opening therein, a slot extending laterally from the opening, and a tubular guide extending inwardly from the opening toward the end of the handle, and in alinement with the socket of the handle, a tool-blade fitting the tubular guide and provided at its inner end with an enlargement or head fitting the socket, said blade adapted to be adjusted inwardly into the socket, when the tool is not in use, and to be adjusted outwardly through the opening in the end of the thimble, when the tool is to be used, a spring-arm fitting in a recess therefor in the handle, the end of said arm projecting through the lateral slot of the thimble, and formed or provided with a projecting lug and with a finger-piece, said lug adapted to engage the blade, when said blade is adjusted outwardly, and to be disengaged from the blade, to permit of the blade being adjusted inwardly, the disengagement of the lug being effected by grasping the finger-piece, and pulling the spring-arm out laterally in the lateral slot of the thimble.

In testimony whereof I affix my signature in presence of two witnesses.

ANDREW C. LANS.

Witnesses:
E. C. GETCHEL,
D. B. KENNEDY.